March 10, 1970        S. YANDO        3,500,451

PIEZOELECTRIC VOLTAGE GENERATOR

Filed June 29, 1967        3 Sheets-Sheet 1

INVENTOR.
STEPHEN YANDO

BY *R. J. Frank*
ATTORNEY.

March 10, 1970  S. YANDO  3,500,451
PIEZOELECTRIC VOLTAGE GENERATOR
Filed June 29, 1967  3 Sheets-Sheet 2

INVENTOR.
STEPHEN YANDO
BY R. J. Frank
ATTORNEY.

March 10, 1970  S. YANDO  3,500,451
PIEZOELECTRIC VOLTAGE GENERATOR
Filed June 29, 1967  3 Sheets-Sheet 3

INVENTOR.
STEPHEN YANDO
BY R. J. Frank
ATTORNEY.

 …

3,500,451
PIEZOELECTRIC VOLTAGE GENERATOR
Stephen Yando, Huntington, N.Y., assignor to General Telephone & Electronics Laboratories Incorporated, a corporation of Delaware
Filed June 29, 1967, Ser. No. 649,990
Int. Cl. H01h 57/00
U.S. Cl. 310—8.5          9 Claims

ABSTRACT OF THE DISCLOSURE

A piezoelectric voltage generator suitable for igniting low impedance photographic flash lamps. A cantilevered beam element is provided which consists of a sheet of piezoelectric material bonded to a flexible electrically conductive sheet. When the unsupported end of the beam is displaced and released, the beam rebounds momentarily touching an electrical contact at the point of maximum beam displacement. Energy stored in the piezoelectric sheet is transferred efficiently to a photoflash lamp connected across the piezoelectric sheet through the electrical contact.

BACKGROUND OF THE INVENTION

This invention relates to piezoelectric voltage generators and, in particular to a piezoelectric generator for igniting photographic flash lamps.

Conventionally, the energy for ignition of photoflash lamps used in portable photographic equipment is obtained from batteries installed in the flash gun or camera. However, batteries are not entirely satisfactory since they deteriorate with use and time, and must be replaced at relatively frequent intervals. Piezoelectric generators have been proposed as a replacement for batteries since they are capable of producing a large amount of energy, have a life commensurate with that of the rest of the camera and remain relatively stable in performance without significant loss of voltage or electrical capacity.

In one system disclosed by the prior art, a piezoelectric element is mechanically stressed and the electrical energy generated thereby stored in a capacitor. The charge in the capacitor is then discharged into a photoflash lamp by connecting the capacitor directly across the lamp. This system is disadvantageous in that it requires a capacitor which must be charged before lamp ignition can take place.

Another known method involves connecting the photoflash lamp directly across a piezoelectric crystal. When the crystal is struck sharply by a hammer, a voltage is generated across the crystal thereby igniting the lamp. While this second method does not require a capacitor, it is inefficient since the high impedance of the piezoelectric crystal coupled directly to a much lower impedance flash lamp results in poor power transfer to the lamp.

Accordingly, I have invented a piezoelectric voltage generator which does not employ a capacitor or other external storage element yet transfers energy efficiently into a low impedance load such as a photoflash lamp.

SUMMARY OF THE INVENTION

In the present invention, a piezoelectric generator is provided which comprises a sheet of piezoelectric material having inner and outer opposing surfaces and a flexible electrically conductive member also having inner and outer opposing surfaces. The inner surfaces of the piezoelectric sheet and flexible conductive member are bonded together to form a composite beam element having first and second outer opposing surfaces corresponding to the outer surfaces of the piezoelectric sheet and the flexible conductive member.

A first end of the composite beam is fixedly supported, the other or second end being unsupported permitting the beam to be deflected by application of a force having a component normal to the surface thereof. An electrode is located adjacent the second end of the beam element and is spaced from the first outer surface of the beam when the beam is in its undeflected position. A load, such as a photoflash lamp, is connected between the electrode and the second outer surface of the beam.

The piezoelectric ceramic sheet exhibits an electrical capacitance which may be charged by bending or otherwise temporarily deforming the sheet to produce a mechanical stress therein. This stress results in a voltage being generated between the surfaces of the ceramic sheet which increases in magnitude as the deflection of the beam from a position of normal stress is increased. When the unsupported second end of the beam is displaced by application of a force normal to its surface followed by removal of the force, the beam rebounds touching the electrode at the point of substantially maximum free displacement. Maximum voltage is generated across the piezoelectric sheet at this instant and consequently energy is transferred with maximum efficiency into the load. This is in contrast to the prior art piezoelectric photoflash lamp igniter in which the low impedance (less than 1 ohm) lamp is connected directly across the relatively high impedance (about 15,000 ohms) piezoelectric sheet during all or most of the beam deflection cycle resulting, due to the impedance mismatch, in an inefficient transfer of energy from the piezoelectric material to the lamp.

In one embodiment of the invention, the surface of the composite beam element is essentially triangular in shape, the wide end being supported and the narrow end being free to vibrate. The triangular shape causes the beam to assume a circular configuration when deflected, thereby stressing all portions of the beam equally. This is in contrast to rectangular surface configurations which cause the beam to assume an essentially parabolic curve when deflected resulting in unequa lstress distribution. In order to assure good electrical contact to the load a thin film of conductive paint or similar material is applied to the outer surface of the piezoelectric sheet.

In another embodiment of the invention, two beam elements are employed in a balanced configuration. This provides greater energy output than a single beam element of comparable size and also tends to reduce the effect of any vibration or shock which may be produced when a single beam is deflected and released.

BRIEF DESCRIPTION OF THE DRAWINGS

Referring to FIG. 1, the piezoelectric generator of my invention comprises a sheet of piezoelectric ceramic material 10 having one surface conductively bonded to a surface of a flexible electrically conductive member 12 to form a composite beam 14. The beam 14 is attached at one end to a supporting structure 16 forming a cantilever. The piezoelectric sheet 10 and conductive member 12 have substantially triangular surface areas, the broad end or base of the triangle being affixed to the support 16. At the free end 18 of beam 14, the conductive member 12 is truncated and extended to protect the pointed end of the piezoelectric sheet 10.

Figure 1:
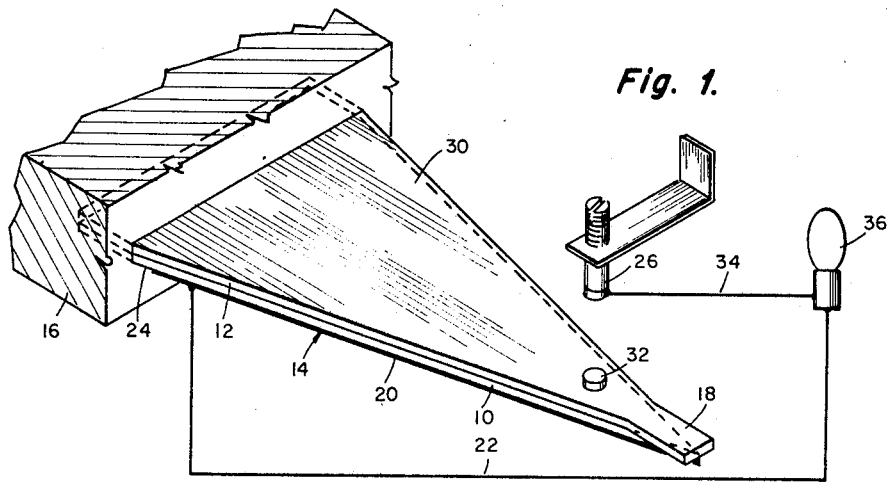
FIG. 1 is a perspective view of one embodiment of my invention in its undeflected or normal position.

A thin film 20 of low resistance conducting paint is applied to the outer surface of piezoelectric sheet 10 to permit current to be conducted uniformly to lead wire 22 from substantially the entire surface of sheet 10. If the material from which support 16 is made is electrically conductive, a gap 24 must be provided between film 20 and the support to avoid short-circuiting the film to member 12. Gap 24 is not required if a non-conductive support structure is used.

An electrode 26 is mounted adjacent the free end of beam 14 and is threaded to permit adjusting its position relative to the outer surface 30 of conductive member 12. A contact element 32 affixed to member 12 assures good electrical contact between member 12 and electrode 26 when the beam and contact touch momentarily as hereinafter explained. A lead 34 connects electrode 26 to one terminal of photoflash lamp 36, the other terminal being connected to film 20 by lead 22.

When beam 14 is at rest in its undeflected position electrode 26 is separated from member 12, lamp 36 being deenergized as shown in FIG. 1. Application of a force F by a suitable mechanical triggering device (not shown) bends beam 14 downward producing tensile stresses in the conductive member along the line AB (FIG. 2a) and compressive stresses along the line CD of the piezoelectric material. It can be shown that due to the triangular surface area of piezoelectric sheet 10 the bending moment is uniform over the entire surface of sheet 10. Consequently, lines AB and CD form coaxial arcs of circles having a common center, the position of the center being determined by the magnitude $d$ of beam deflection. As a result, the ceramic sheet 10 is stressed uniformly throughout its entire length.

Figures 2A, 2B:
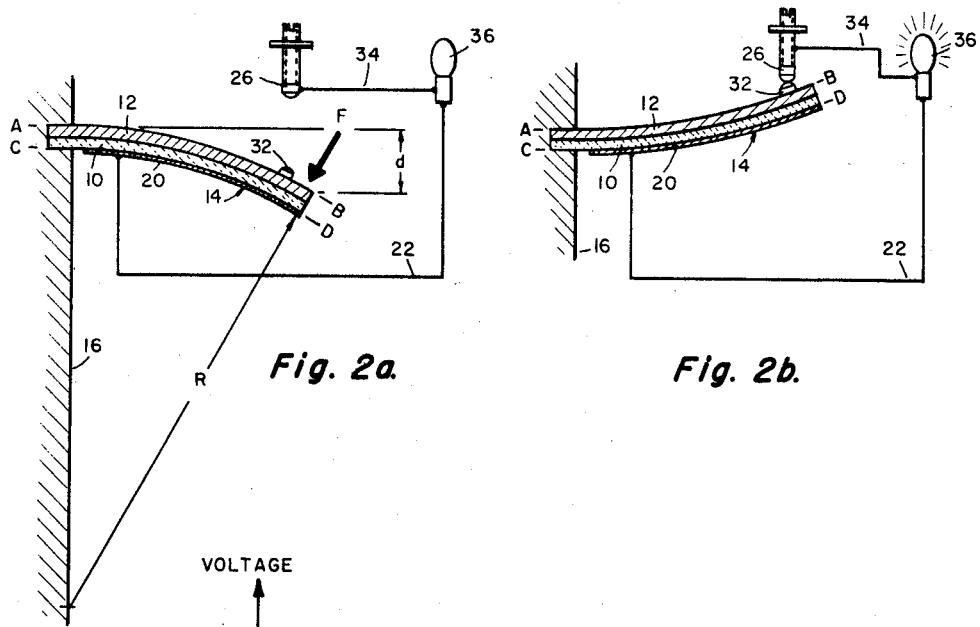
FIG. 2a is a side elevation view of the deflected beam prior to release of the triggering element and FIG. 2b shows the beam at its position of maximum deflection after release.

Removal of the force F permits the beam 14 to rebound and oscillate at its natural frequency. FIG. 2b shows the beam on its first rebound as contact 32 touches electrode 26. At this instant the voltage across the piezoelectric sheet 10 is a maximum and an amount of energy proportional to the capacitance of sheet 10 and the square of the voltage thereacross is discharged into photoflash lamp 36 resulting in ignition of the lamp.

Figure 3:
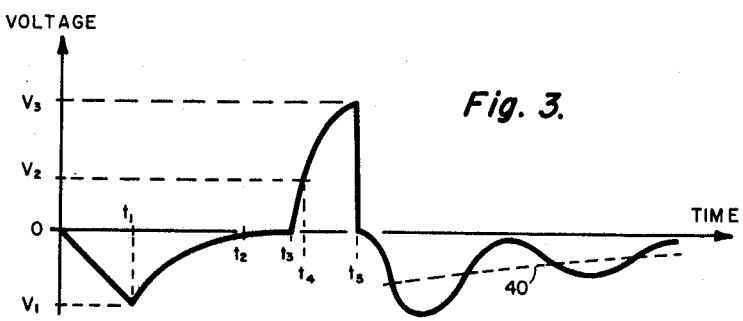
FIG. 3 shows the relationship between voltage across the beam element and time after release.

A typical waveform of the voltage across piezoelectric sheet 10 is shown in FIG. 3 as a function of time. At time $t=0$, the voltage across piezoelectric sheet 10 is zero and the beam 14 is in the neutral unstressed position shown in FIG. 1. During the interval $t=0$ to $t=t_1$, the force F is applied to the beam until at $t_1$ the beam has reached the position shown in FIG. 2a and the voltage across the sheet has increased to a negative value $V_1$. If the beam is held in this position the sheet 10, acting as a capacitor, discharges through its leakage resistance reducing the voltage thereacross to zero at $t_2$. At $t_3$ the force F is removed, the beam rebounds upward to its neutral position at $t_4$ generating a positive voltage $+V_2$. As the beam continues to move upward, the voltage increases in an approximately sinusoidal manner until at $t_5$ it reaches a peak value $V_3$. The voltage $V_3$ corresponds to the point of maximum deflection shown in FIG. 2b at which contact 32 touches electrode 26 permitting current to flow into lamp 36. When contact 32 touches electrode 26, the voltage across piezoelectric sheet 10 drops to zero and then oscillates about an average negative value corresponding initially to the voltage magnitude $V_2$ generated when the beam is passing through its neutral position. This voltage increases exponentially from its initial value of $-V_2$ to zero as indicated by dashed line 40 in FIG. 3.

In a typical embodiment of the invention, the piezoelectric strip 10 is made of polarized lead-zirconate-titanate ceramics and is bonded to a steel conductive member 12 by an epoxy resin. The conductive film 20 may be in the form of silver paint or other thin metallic deposit.

Figure 4A:
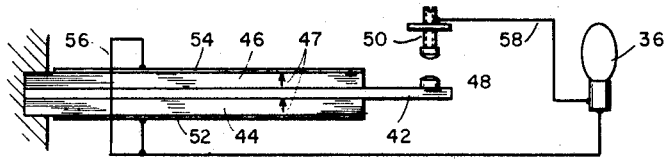
FIGS. 4a and 4b illustrate a second embodiment of the invention employing two piezoelectric sheets for increased current output.
Figure 4B:
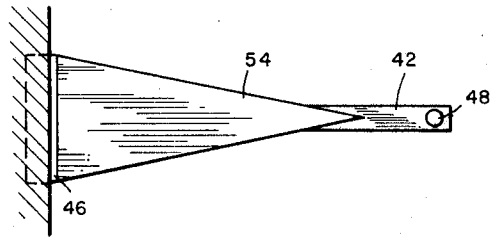

FIGS. 4a and 4b illustrate a modification of the generator shown in FIG. 1 wherein a steel member 42 has triangular piezoelectric sheets 44 and 46 bonded to each side. Sheets 44 and 46 are polarized normal to their surfaces and in the same direction as shown by arrows 47. A contact 48 is affixed to an extension of member 42 and is arranged to touch an electrode 50 at the top of the first beam vibration cycle as in the embodiment of FIG. 1. Thin conductive films 52 and 54 affixed to the outer surfaces of piezoelectric shets 44 and 46 respectively are connected together by a conductor 56 and to one terminal of the photoflash lamp 36, the terminal of lamp 36 being connected to electrode 50 by lead 58. The use of two piezoelectric sheets 44 and 46 substantially increases the current supplied to lamp 36 during ignition over that obtained with the single beam device of FIG. 1.

Figure 5A:
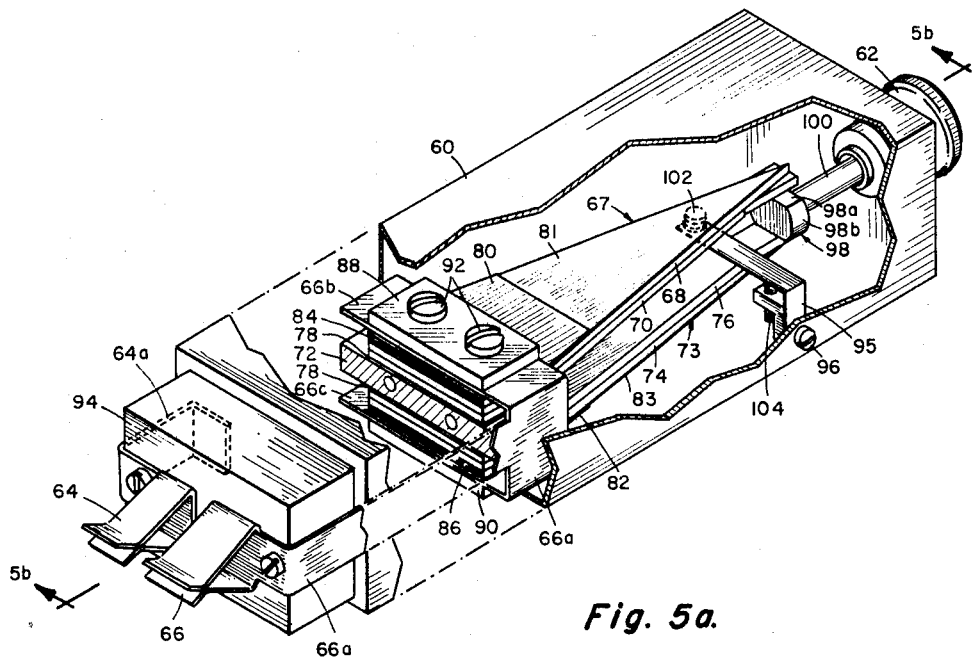
FIG. 5 is a perspective cutaway view of another embodiment of the invention.
FIG. 5b is a cross-section view taken along the lines 5b—5b of FIG. 5a and FIG. 5c shows a portion of the beam element prior to release.

FIG. 5a illustrates an embodiment of the invention in which first and second beam elements vibrating in opposite directions are employed. The use of two beams increases the current output of the device and, since the beams move in opposite directions, any tendency for the generator to produce external vibrations is minimized. This is particularly important when the piezoelectric generator is used in conjunction with a camera to ignite a flash lamp since undue vibration will tend to move the camera and result in a blurred picture.

Figure 5B:
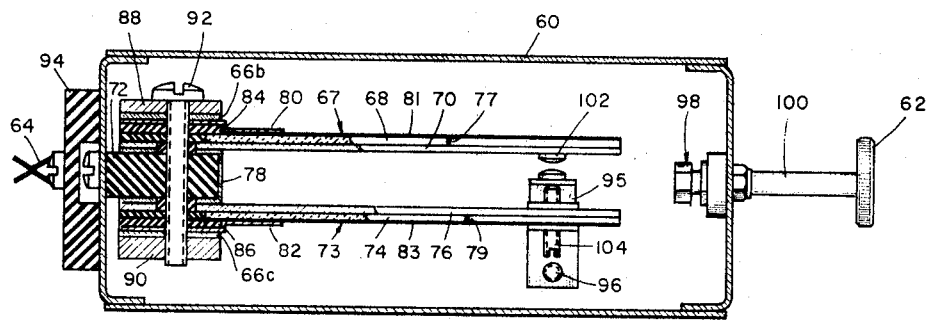

As illustrated in the perspective exploded view of FIG. 5a and the cross-sectional view of FIG. 5b, the beam elements are contained in a metallic case 60 having an operating knob 62 projecting from one end and terminals 64 and 66 for connecting to the load at the other end. A first beam 67 comprising a triangular piezoelectric sheet 68 and a steel member 70 is secured to a mounting block 72. The second beam element 73 consists of a piezoelectric sheet 74 and a steel member 76 secured to the other side of block 72. Piezoelectric sheets 68 and 74 are polarized normal to their surfaces but in opposite directions as shown by arrows 77 and 79. Thin conductive films 81 and 83 cover the surfaces of piezoelectric sheets 68 and 74 respectively.

A U-shaped conductive element 78 is interposed between insulating block 72 and steel members 70 and 76, thereby electrically connecting members 70 and 76. Thin conductive foils 80 and 82 are bonded to films 81 and 83 on piezoelectric sheets 68 and 74 respectively at one end but are separated therefrom at the fixed end adjacent block 72 by spacers 84 and 86. Terminal 66, which is provided with a connecting strap 66a, upper arm 66b and lower arm 66c, is electrically connected to piezoelectric sheets 68 and 74 through foils 80 and 82. Clamping plates 88 and 90 are positioned over arms 66b and 66c respectively, the entire assembly being secured by bolts 92. Terminal 64 is provided with a connecting strap 64a which is held conductively to the side of metallic case 60 by terminal block 94.

An electrode 95 projecting between conductive members 70 and 76 is secured by a screw 96 to the side of case 60. An essentially rectangular actuating element 98 having flat sides 98a and rounded ends 98b is positioned between members 70 and 76 and is attached to knob 62 by a shaft 100 journaled in the end of case 60.

Figure 5C:
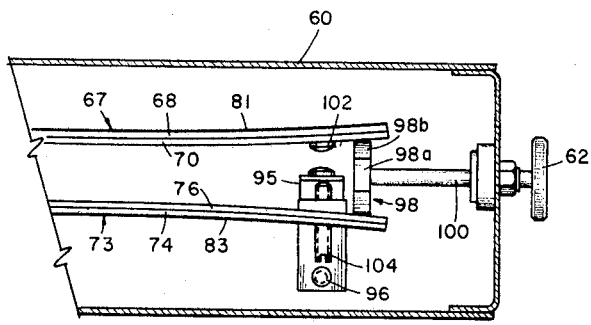

When the voltage generator is in the unactuated position, the actuating element is in the position shown in FIG. 5a. To actuate the device, knob 62 is rotated 90 degrees bringing the rounded ends 98b of actuating element 98 into contact with members 70 and 76 forcing them apart as shown in FIG. 5c. This action causes a voltage to be generated across piezoelectric strips 68 and 74, the voltage then decaying to zero as previously explained in connection with the embodiment of FIG. 1. Knob 62 is next pulled outward to the position shown in FIG. 5b allowing the beams 67 and 73 to move inward until contact 102 touches electrode 95. Screw 104 is adjusted so that contact 102 just touches electrode 95 at the end of the first vibration cycle, the position corresponding to maximum voltage across piezoelectric strips 68 and 74.

When contact 102 touches electrode 95, the conductive members 70 and 76 (which are electrically coupled by U-shaped element 78) are connected through electrode 95 to case 60 and terminal 64. Since members 70 and 76 are conductively bonded to piezoelectric strips 68 and 74, the piezoelectric strips are effectively connected across terminals 64 and 66 at this instant. Consequently, current will flow into a load connected across the terminals. The energy transferred to the load is independent of the relative impedance of the load and generator and consequently a low impedance photoflash lamp may be ignited as previously explained.

If desired, a gel such as Dow Corning Sylgard 51 may be interposed between the conductive members 70 and 76 to minimize the possibility of destructive high order vibrations and to assure quiet troublefree operation.

While I have shown and pointed out my invention as applied above, it will be apparent to those skilled in the art that modifications can be made within the scope and sphere of my invention.

What is claimed is:

1. Voltage generating apparatus comprising
   (a) a sheet of piezoelectric material having inner and outer opposing surfaces,
   (b) a flexible electrically conductive member having inner and outer opposing surfaces, the inner surface of said conductive member being affixed to the inner surface of said strip of piezoelectric material, said sheet of piezoelectric material and said conductive member forming a beam element having first and second outer opposing surfaces and first and second ends,
   (c) means for fixedly supporting the first end of said beam element, said beam element having an undeflected position and a position of substantially maximum deflection, and
   (d) an electrode located adjacent the second end of said beam element, said electrode being spaced from the first outer surface of said beam element when said beam is in its undeflected position and being electrically connected to the first outer surface of said beam element when said element is in its position of substantially maximum deflection, a voltage being produced between said electrode and the second outer surface of said beam element when said beam element is displaced to said position of maximum deflection.

2. Voltage generating apparatus as defined by claim 1 wherein said sheet of piezoelectric material has surfaces which are essentially triangular in shape.

3. Voltage generating apparatus as defined by claim 1 wherein a conductive film is affixed to the outer surfaces of said sheet of piezoelectric material.

4. Voltage generating apparatus as defined by claim 2 wherein a conductive film is affixed to the outer surface of said sheet of piezoelectric material and a load element is coupled between said electrode and said conductive film, energy being transferred to said load element from said sheet of piezoelectric material when said beam element is deflected to electrically connect the outer surface of the beam element to said electrode.

5. Voltage generating apparatus as defined by claim 1 wherein a second sheet of piezoelectric material is affixed to the outer surface of said flexible electrically conductive member, the sheets of piezoelectric material being electrically connected.

6. Voltage generating apparatus comprising
   (a) first and second spaced beam elements having first and second outer opposing surfaces and first and second ends, each of said beam elements comprising
      (1) a sheet of piezoelectric material having inner and outer opposing surfaces, and
      (2) a flexible electrically conductive member having inner and outer opposing surfaces, the inner surface of said conductive member being affixed to the inner surface of said strip of piezoelectric material,
   (b) means for fixedly supporting the first ends of said first and second beam elements, each of said beam elements having an undeflected position and a position of substantially maximum deflection,
   (c) means for electrically connecting the conductive members of said first and second beam elements,
   (d) means for electrically connecting the piezoelectric sheets of said first and second beam elements,
   (e) an electrode located adjacent the second ends of said first and second beam elements, said electrode being spaced from the first outer surfaces of said beam elements when said beam elements are in their undeflected position and being electrically connected to the first outer surface of at least one of said beam elements when said beam elements are in their positions of substantially maximum deflection, and
   (f) actuating means positioned between said first and second beam elements, said actuating means having a first position wherein said means displaces said first and second beam elements with respect to each other and a second position wherein said beam elements are free to vibrate, a voltage being produced between said electrode and the second outer surfaces of said first and second beam elements when said beam elements assume their position of maximum displacement.

7. Voltage generating apparatus as defined by claim 6 wherein the sheets of piezoelectric material composing said first and second beam elements have surfaces which are essentially triangular in shape.

8. Voltage generating apparatus as defined by claim 6 wherein a conductive film is affixed to the outer surfaces of each of said sheets of piezoelectric material and wherein said apparatus is provided with first and second output terminals, said piezoelectric sheets being coupled through said conductive films to said first output terminal and said electrode being coupled to said second output terminal.

9. Voltage generating apparatus as defined by claim 6 wherein said first and second beam elements vibrate simultaneously and in opposite directions, the piezoelectric sheets composing said first and second beam elements being polarized normal to the surfaces thereof and in opposite directions.

References Cited

UNITED STATES PATENTS

| | | | |
|---|---|---|---|
| 2,756,353 | 7/1956 | Samsel | 310—8.5 |
| 2,835,761 | 5/1958 | Crownouer | 310—8.5 |
| 2,867,701 | 1/1959 | Thurston | 310—8.5 |
| 2,875,353 | 2/1959 | Cavalieri | 310—8.5 |
| 2,921,252 | 1/1960 | Schiavone | 310—8.5 |
| 3,098,163 | 7/1963 | Bliss | 310—8.7 |
| 3,110,824 | 11/1963 | Flanagan | 310—8.5 |
| 3,113,223 | 12/1963 | Smith | 310—8.5 |
| 3,211,069 | 10/1965 | Rixton | 310—8.7 |
| 3,219,850 | 11/1965 | Langevin | 310—8.6 |
| 3,363,139 | 1/1968 | Schiavone | 310—8.1 |

J D MILLER, Primary Examiner

U.S. Cl. X.R.

95—11.5; 310—8.2, 9.1, 9.6